Aug. 14, 1951  W. DZUS  2,564,101
FASTENER RECEPTACLE

Filed March 10, 1948  2 Sheets-Sheet 1

INVENTOR
William Dzus
By *[signature]*
ATTORNEY

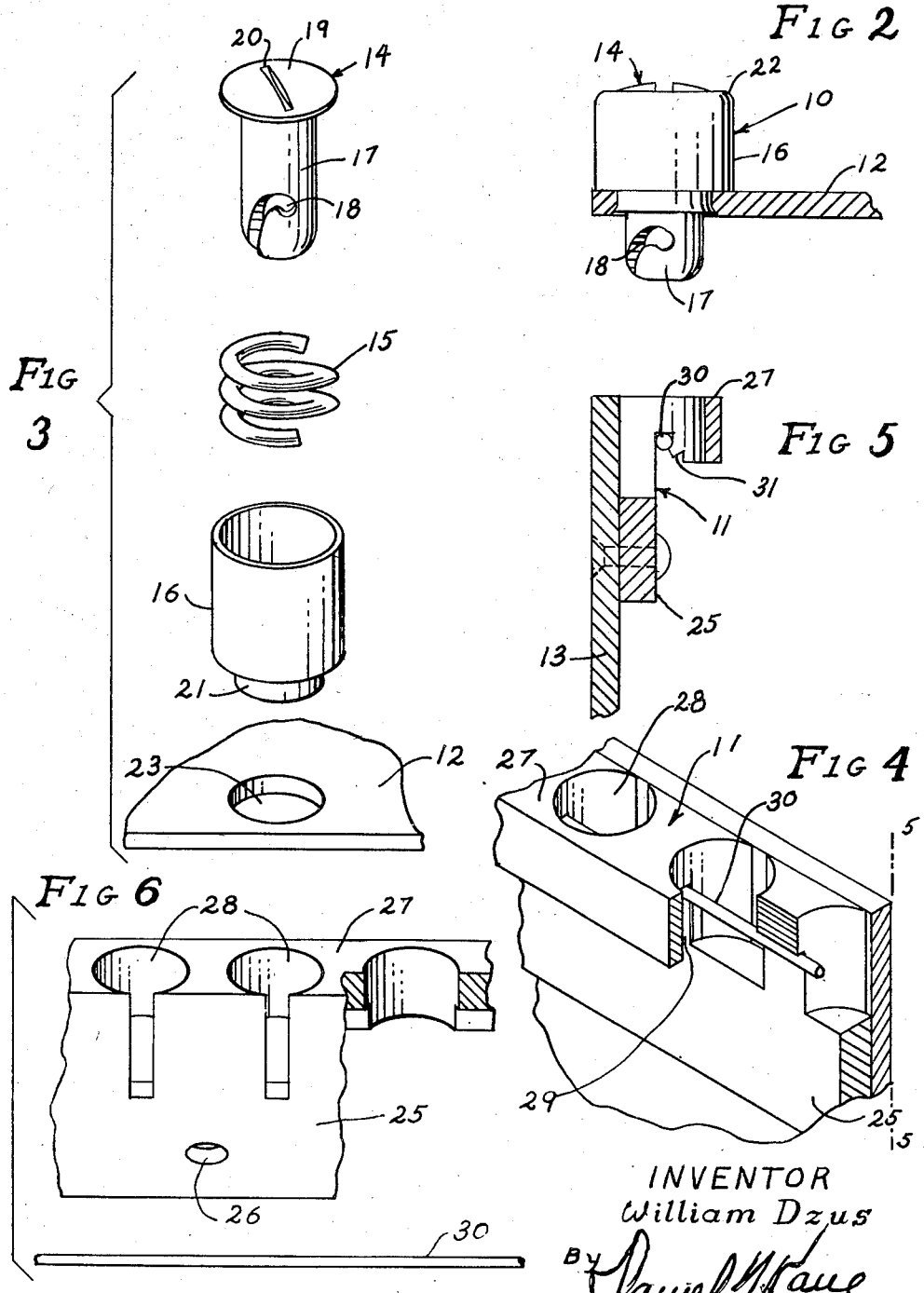

Patented Aug. 14, 1951

2,564,101

UNITED STATES PATENT OFFICE 2,564,101

FASTENER RECEPTACLE

William Dzus, West Islip, N. Y.

Application March 10, 1948, Serial No. 14,029

4 Claims. (Cl. 24—204)

This invention relates to an improved fastener of the quick-acting, self-locking type.

It is an object of the invention to provide an improved fastener of the above type which occupies or requires a relatively small amount of space for its installation; which is relatively simple and inexpensive to manufacture and install; which has a relatively high ratio of strength to weight and bulk; and which can withstand repeated operation, vibration and long usage with a minimum amount of wear.

Another object of the invention is the provision of an improved fastener receptacle in strip or gang form having multiple outlet or connection points to any one or all of which the fastener studs may be connected.

In the accompanying drawings,

Fig. 2 is a side elevational view of one of the stud assemblies showing the supporting plate in section;

Fig. 3 is an exploded view showing the component parts of the stud assembly;

Fig. 4 is a perspective view partly broken away showing a portion of the strip or gang receptacle;

Fig. 5 is a sectional view on the line 5—5 of Figure 4;

Fig. 6 is an exploded view showing the component parts of the receptacle; and

Referring to the first six figures of the drawings, my fastener consists generally of a stud assembly 10 and a receptacle 11 which are releasably engageable with each other so as to secure two parts together.

Figure 1:
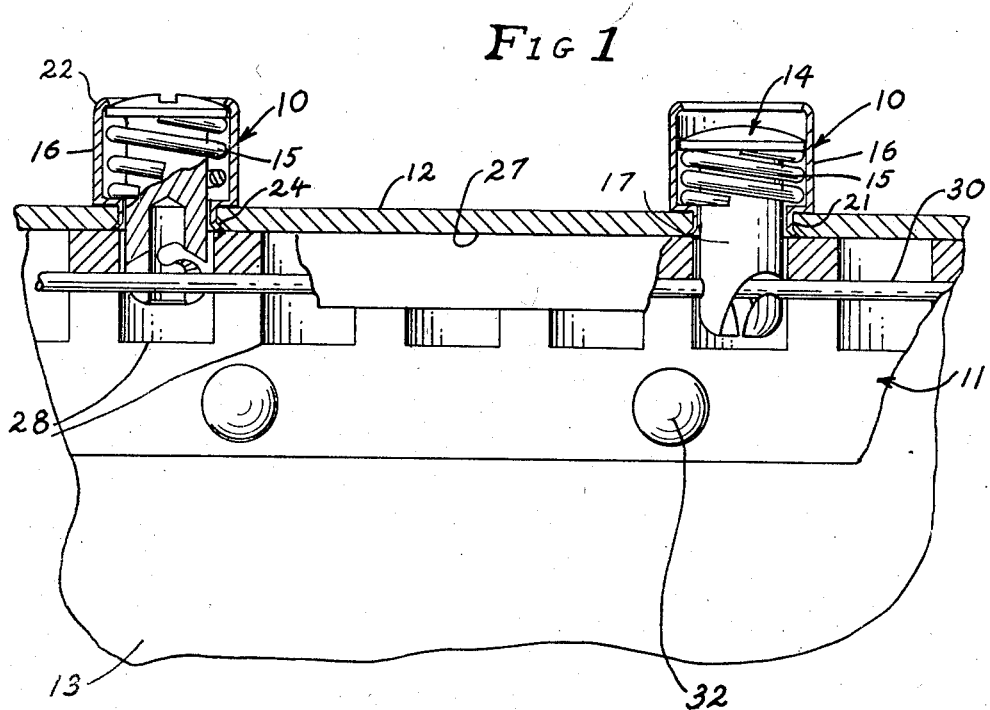
Fig. 1 is an elevational view, in section, of a fastener embodying my invention showing two fastener stud assemblies in association with a fastener receptacle of the strip or gang type.

In Fig. 1, a pair of stud assemblies 10 are shown as holding a cover plate 12 attached to the side wall 13 of a box, supporting frame or other structure. Each of the stud assemblies consists of a stud 14 surrounded by a helical spring 15 and partially encased by a retaining cup 16.

The stud is of the spiral cam type generally similar to that shown in my Patent No. 1,955,740 and has a shank portion 17 having a tubular lower end formed with a pair of similar oppositely disposed spiral cam slots 18 extending inwardly from the lower end and terminating in a locking portion. The upper end of the shank is provided with a head 19 which in turn may have a screw driver slot 20 or other operating means.

The helical spring 15 is of such a diameter as to accommodate the shank of the stud but is smaller in diameter than the head of the stud. When assembled, the spring surrounds the shank of the stud beneath the head, as shown.

The cup is slightly larger in diameter than the head of the stud and normally surrounds the head, the spring and the upper portion of the shank. An aperture large enough to accommodate the shank is provided in the lower portion of the cup, and an attaching flange 21 depends downwardly from the aperture. Prior to assembly, the cup is formed as shown in Fig. 3.

Upon assembly, as previously stated, the spring surrounds the upper portion of the shank beneath the head. The lower portion of the shank is then projected through the aperture and the flange in the lower portion of the retaining cup, and the parts are telescoped together until the head of the stud is disposed within the cup. The upper edge of the cup is then turned inwardly, as shown at 22, overlapping the upper surface of the head and thereby preventing the head of the stud from withdrawing or projecting from the cup and also retaining the parts in assembled relationship.

The parts should be so proportioned that the spring 15 extends between the base of the retaining cup and the under surface of the head of the stud, normally retaining the stud, when in unlocked position, in the fully elevated position shown in Fig. 2 and in the left side of Fig. 1. As a matter of fact, the spring may be of slightly greater length than required so that it is normally in pre-loaded condition when in unlocked position.

In attaching the assembly to a part such as the plate 12, an aperture 23, large enough to accommodate the flange 21, is first formed therein. The lower end of the stud is then projected through the aperture and flange 21 is inserted therein. The lower end of the flange is then flared outwardly as shown at 24, in Fig. 1, thereby serving to firmly hold the assembly in place.

The receptacle 11 is of the strip or gang type and may be machined, cast or extruded from metal or other suitable material. It is in the form of an elongated strip having a depending backing plate 25 formed with apertures 26 for accommodating rivets or similar attaching means 32 whereby the receptacle is secured to the wall 13. The upper portion of the backing plate 25 is formed with a platen or head 27 of greater width. A series of apertures 28 are formed in the backing plate and platen in closely spaced relationship, and each of these notches is large enough to accommodate the shank 17 of the stud. Extending upwardly between the lower portion of the platen and the backing plate is a slot 29 in which is disposed an elongated wire or rod 30 which, it should be noted, extends centrally through the apertures 28 providing a series of cross bars or locking bars for engagement with the spiral slots 18 of the stud. The rod or wire may be staked or otherwise secured in place as indicated in 31, Fig. 5.

In using the device, the fastener assembly is first secured in place on the cover or removable part 12 in the manner previously described. The receptacle 11 is then attached to the fixed part as by means of rivets 32. In this connection, the receptacle should be so arranged that the wall platen is at or near the upper edge of the wall 13 so that the cover rests thereon. The stud 17 may then be projected into one of the apertures 28. Due to the fact that a plurality of apertures 28 are provided in closely spaced relationship, engagement may be made at any one or more of a plurality of points.

In Fig. 1, the plate 12 is illustrated as provided with two stud assemblies. The shanks of the studs project into two of the apertures. The stud shown at the left is in unlocked position and the stud at the right is in locked position.

The parts should be so proportioned and arranged that when the stud is unlocked, the rod or wire 30 will rest in the entrance portions of the slots 18. This is clearly shown on the left hand side of Fig. 1 in which the lower portion of the shank of the stud has been sectioned. When disposed in this relationship, the rotation of the stud, in a clockwise direction, causes the stud to be drawn downwardly by the camming action between slots 18 and the wire or rod until the wire is locked in the terminal portions of the slots as shown at the right hand side of Fig. 1.

When fully locked, the head of the stud is spaced downwardly beneath the top of the retaining cup, and the helical spring 15 is partially compressed. The action of the spring against the head of the stud serves to lock the ends of the slots with respect to the rod or wire and to hold the stud in locked position.

The fastener may be readily opened by simply rotating the stud for approximately a quarter turn in a counterclockwise direction.

The fastening device, as shown and described herein, is thus composed of a relatively few number of parts that can be readily assembled. Each unit, i. e. the stud assembly and receptacle, is a complete self-contained unit and is easy to install. The stud assembly is very compact, and it will be seen that the stud is retained in place in a novel and effective manner. The receptacle is of the strip or gang type and permits engagement or attachment at any one or more of a number of points. The fastener requires a minimum amount of space for its installation.

Figure 7:
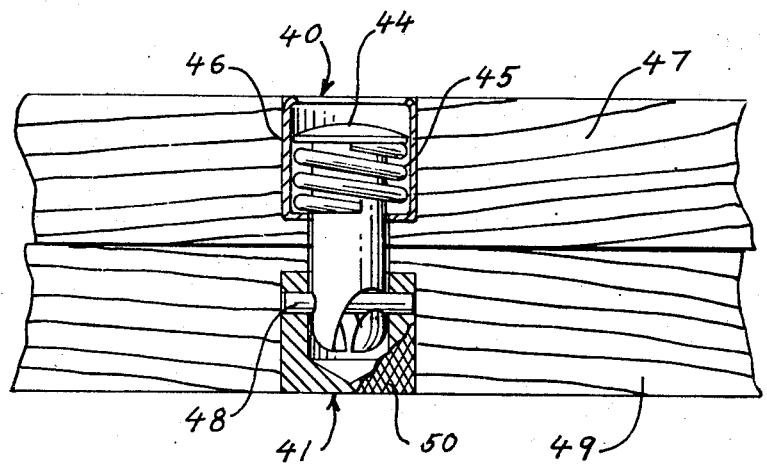
Fig. 7 is a sectional view in elevation showing a modified type of fastener.

In Fig. 7, I have shown a modified fastener consisting of a stud assembly 40 and a receptacle 41. The stud assembly consists of a stud 44 similar to the stud 14, a helical spring 45 similar to the spring 15 and a retaining cup 46 somewhat similar to the retaining cup 16. However, the attaching flange 21 at the lower portion has been omitted. The stud assembly is shown in Fig. 7 as applied to a relatively thick panel made of wood or other similar material. This is accomplished by forming an aperture in the panel and countersinking the retaining cup 46, therein providing a good driving or friction fit.

The receptacle 41 consists of a tubular cup having a central opening or aperture large enough to accommodate the shank of the stud and provided with a cross bar or locking bar 48. The receptacle is also shown as applied to a relatively thick panel 49 made of wood or similar material. In this connection, the receptacle should have a driving or friction fit with an aperture formed therein. To keep the receptacle from rotating, the outer surface may be knurled as shown at 50.

Beneath the cup 46 and above the receptacle 41 the panels 47 and 49 are provided with apertures large enough to accommodate the shank of the stud. The panels are placed in position with the apertures in registry, with the result that the lower portion of the shank of the stud enters into the receptacle 41, and the cross bar 48 will rest in the entrance portions of the slots of the stud in the same manner as shown in the left hand portion of Fig. 1 in the first form of my invention.

When the stud is rotated a quarter turn in a clockwise direction, it assumes the locked position shown in Fig. 7, and the force exerted by the spring against the head of the stud serves to retain the parts in locked relationship. Rotation of the stud, a quarter turn in a counterclockwise direction, serves to release or open the fastener.

The fastener shown in Fig. 7 embodies all of the advantages of the first form of my invention with the exception that a separate or individual receptacle is utilized in place of a strip or gang receptacle.

Modifications may be made in the illustrated and described embodiments of the invention without departing from the invention as set forth in the accompanying claims.

I claim:

1. A fastener receptacle of the strip type for use with a spiral cam type fastener stud comprising an elongated strip formed with a plurality of stud receiving apertures arranged in spaced relationship and having a slot extending inwardly from one surface thereof and an elongated rod mounted at the inner end of said slot and intersecting said apertures so as to provide a locking bar in each of the apertures for engagement with the spiral cam stud.

2. A fastener receptacle of the strip type for use with a spiral cam type fastener stud comprising an elongated, relatively narrow strip formed with a plurality of proximately positioned apertures arranged in a row, said strip having a slot extending inwardly from one surface thereof and intersecting the apertures diametrically, and an elongated rod mounted at the inner end of said slot so as to provide a locking bar in each of the apertures for engagement with the spiral cam stud.

3. A fastener receptacle for use with a fastener stud of the spiral cam type and comprising a metal strip formed with a narrow platen along the upper surface thereof and with an elongated flange of lesser width than the platen depending from the platen and flush with one edge thereof, said strip being formed with an aperture of greater width than the flange and of lesser width than the platen extending through the platen and only part way through the flange and a rod on the under surface of the platen and extending longitudinally of the flange and diametrically across the aperture and being in contact with said flange to provide a locking bar for engagement with the spiral cam stud.

4. A fastener receptacle as set forth in claim 3 in which the platen is formed with a slot extending inwardly from the under surface thereof and intersecting said aperture diametrically and the rod is mounted at the inner end of the slot.

WILLIAM DZUS.

REFERENCES CITED

The following references are of record in the file of this patent:

UNITED STATES PATENTS

| Number | Name | Date |
|---|---|---|
| 221,658 | Atwood | Nov. 18, 1879 |
| 1,056,596 | Sidoli | Mar. 18, 1913 |
| 1,273,360 | Grundmann | July 23, 1918 |
| 1,412,097 | Weimer | Apr. 11, 1922 |
| 1,455,758 | Bourque | May 15, 1923 |
| 2,035,674 | Sipe | Mar. 31, 1936 |
| 2,383,683 | Reidenbach | Aug. 28, 1945 |
| 2,392,718 | Baldwin | Jan. 8, 1946 |
| 2,452,437 | Crowther | Oct. 26, 1948 |
| 2,472,651 | Diaper | June 7, 1949 |